US011824925B1

(12) United States Patent
Haddad

(10) Patent No.: US 11,824,925 B1
(45) Date of Patent: Nov. 21, 2023

(54) NODE-TO-NODE NETWORK TIME SYNCHRONIZATION

(71) Applicant: Caterpillar Inc., Peoria, IL (US)

(72) Inventor: Christopher Haddad, Morris, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/936,517

(22) Filed: Sep. 29, 2022

(51) Int. Cl.
*H04L 67/104* (2022.01)
*H04L 67/1061* (2022.01)
*H04L 67/1074* (2022.01)

(52) U.S. Cl.
CPC ...... *H04L 67/1044* (2013.01); *H04L 67/1065* (2013.01); *H04L 67/1085* (2013.01)

(58) Field of Classification Search
None
See application file for complete search history.

(56) References Cited

U.S. PATENT DOCUMENTS

| | | | |
|---|---|---|---|
| 7,983,702 B2 | 7/2011 | Li et al. | |
| 8,385,316 B2 | 2/2013 | Laroia et al. | |
| 8,976,706 B2 * | 3/2015 | Maenpaa | H04L 67/1055 370/254 |
| 10,462,153 B2 | 10/2019 | Stocker | |
| 10,739,814 B2 | 8/2020 | Gomez Gutierrez et al. | |
| 2012/0059864 A1 * | 3/2012 | Bandyopadhyay | H04L 67/1008 707/827 |
| 2013/0054819 A1 * | 2/2013 | Goldfein | H04L 47/10 709/227 |
| 2015/0163133 A1 * | 6/2015 | Grosser | H04L 45/24 370/400 |
| 2018/0249432 A1 | 8/2018 | Kurian et al. | |
| 2019/0089716 A1 * | 3/2019 | Stöcker | H04L 67/1078 |

FOREIGN PATENT DOCUMENTS

| | | |
|---|---|---|
| CN | 104244400 B | 1/2018 |
| CN | 107222923 B | 1/2020 |
| KR | 101871431 B | 6/2018 |

* cited by examiner

*Primary Examiner* — Mohamed Ibrahim

(57) ABSTRACT

In some implementations, a node may receive one or more communications, wherein the one or more communications include time information, and wherein the one or more communications are associated with a peer-to-peer network. The node may identify a primary node associated with the peer-to-peer network based on an indicator included in a communication, from the one or more communications, that is associated with the primary node. The node may synchronize a time stored by the node based on time information included in the communication that is associated with the primary node. The node may receive an indication that the node has successfully joined the peer-to-peer network based on synchronizing the time to the time information. The node may selectively update the time stored by the node based on a reference time included in periodic data transfer communications that are associated with the primary node.

20 Claims, 7 Drawing Sheets

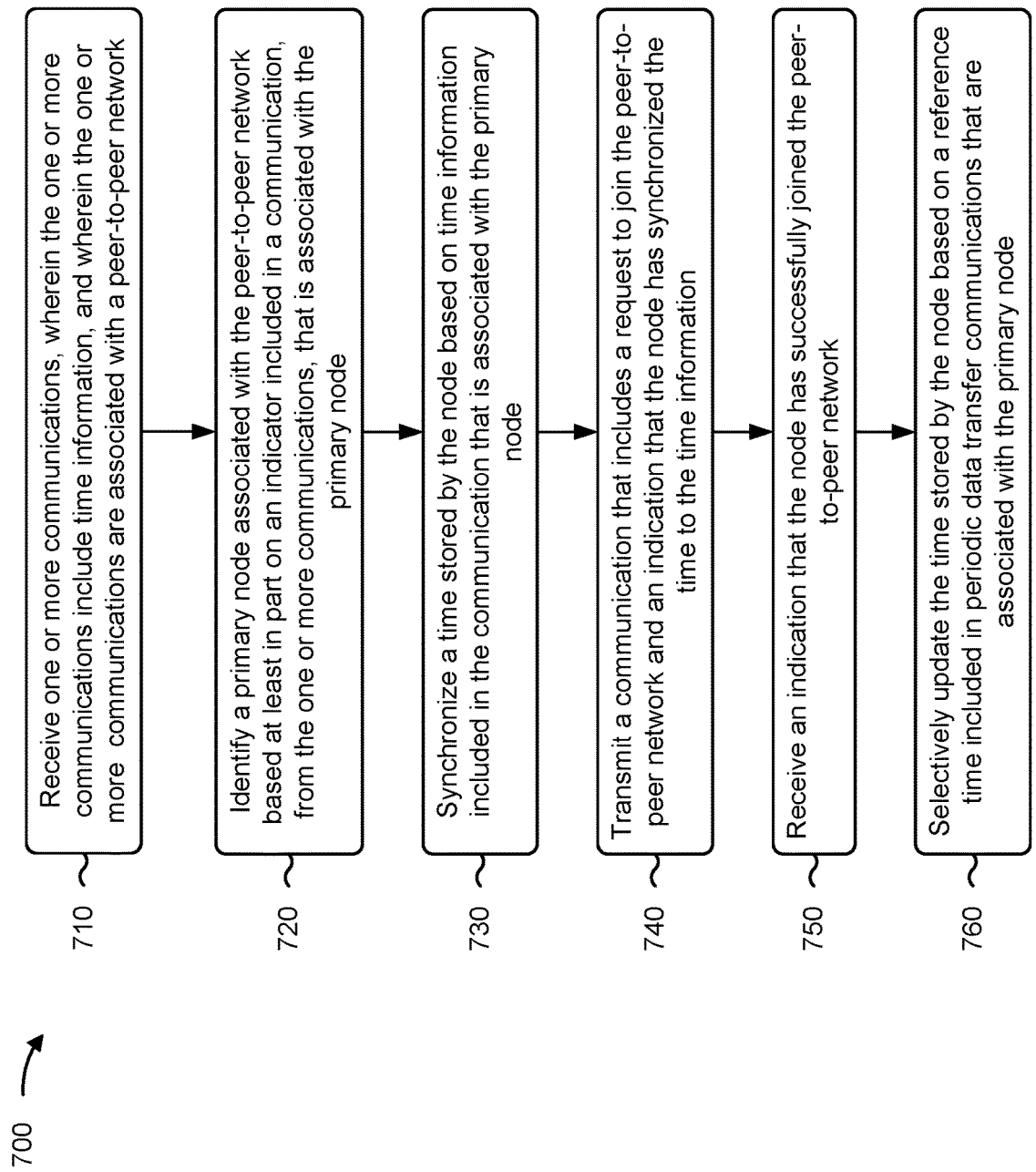

NODE-TO-NODE NETWORK TIME SYNCHRONIZATION

TECHNICAL FIELD

The present disclosure relates generally to time synchronization and, for example, to node-to-node network time synchronization.

BACKGROUND

Peer-to-peer (e.g., node-to-node) networking is a distributed application architecture that partitions tasks or workloads between peers (e.g., nodes). Peers are equally privileged, equipotent participants in the network. Peers may form a peer-to-peer network of nodes. In a peer-to-peer network, nodes make a portion of resources, such as processing power, disk storage, and/or network bandwidth, directly available to other nodes, without the need for central coordination by servers or hosts.

Time synchronization may aim to coordinate otherwise independent clocks. Even when initially set accurately, clocks will differ after some amount of time due to clock drift. Clock drift may be caused by clocks counting time at different rates. In a distributed network, such as a peer-to-peer network or a node-to-node network, each node may independently maintain time (e.g., a clock). However, because there may not any central coordination, time synchronization between nodes of a peer-to-peer network or a node-to-node network may be difficult. In some cases, time synchronization protocols, such as the network time protocol (NTP), may be used to synchronize time and/or clocks among distributed nodes. However, such time synchronization protocols require additional time synchronization signaling between nodes and/or access to a central server that serves as a reference clock. The additional time synchronization signaling may consume network resources, processing resources, and/or computing resources, among other examples. Additionally, in some cases, nodes of the peer-to-peer network or the node-to-node network may not have access to a centralized reference clock (e.g., may not have internet access). Further, a failure of a centralized or primary node (e.g., that maintains a reference clock) may result in a failure for time synchronization for the entire peer-to-peer network or node-to-node network.

China Patent No. 107222923B (the '923 patent) discloses a clock synchronization method which includes time slot synchronization and then clock synchronization on nodes in a network. The clock synchronization method periodically corrects a clock counter of a node through a timing correction time. The clock synchronization method includes: distributing a node number for each node in the network; determining a clock reference node in the network according to the node number of each node; correcting the time slot number of other nodes in the network according to the time slot number information of the clock reference node to complete the synchronization of the time slots of the nodes in the network according to the round-trip delay correction mechanism and the clock counter information of the clock reference node; carrying out clock synchronization on other nodes in the network to complete the clock synchronization of the nodes in the network; acquiring timing correction time preset for the node; and periodically correcting the clock counter of the node according to the timing correction time.

However, the '923 patent introduces additional signaling that is specific to time synchronization. In other words, to perform the time synchronization method disclosed in the '923 patent, nodes may transmit or broadcast additional time synchronization signals in order to perform time synchronization among nodes in a peer-to-peer network. This may consume network resources, processing resources, and/or computing resources, among other examples. Additionally, this may increase a complexity of performing time synchronization among nodes in the peer-to-peer network.

The time synchronization techniques of the present disclosure solves one or more of the problems set forth above and/or other problems in the art.

SUMMARY

Some implementations described herein relate to a node. The node may include one or more memories and one or more processors coupled to the one or more memories. The one or more processors may be configured to receive one or more communications, wherein the one or more communications include time information, and wherein the one or more communications are associated with a load sharing network. The one or more processors may be configured to identify a primary node associated with the load sharing network based on an indicator included in a communication, from the one or more communications, that is associated with the primary node. The one or more processors may be configured to synchronize a time stored by the node based on time information included in the communication that is associated with the primary node. The one or more processors may be configured to transmit a multicast communication that includes a request to join the load sharing network and an indication that the node has synchronized the time to the time information. The one or more processors may be configured to receive an indication that the node has successfully joined the load sharing network. The one or more processors may be configured to selectively update the time stored by the node based on a reference time included in periodic data transfer communications that are associated with the primary node.

Some implementations described herein relate to a method performed by a node. The method may include receiving one or more communications, wherein the one or more communications include time information, and wherein the one or more communications are associated with a peer-to-peer network. The method may include identifying a primary node associated with the peer-to-peer network based on an indicator included in a communication, from the one or more communications, that is associated with the primary node. The method may include synchronizing a time stored by the node based on time information included in the communication that is associated with the primary node. The method may include transmitting a communication that includes a request to join the peer-to-peer network and an indication that the node has synchronized the time to the time information. The method may include receiving an indication that the node has successfully joined the peer-to-peer network. The method may include selectively updating the time stored by the node based on a reference time included in periodic data transfer communications that are associated with the primary node.

Some implementations described herein relate to a node-to-node network. The node-to-node network may include a set of nodes configured to perform load sharing associated with the node-to-node network and a node included in the set of nodes. The node may be configured to identify a primary node associated with the node-to-node network based on an indicator included in a communication that is associated with the primary node. The node may be configured to synchronize a time stored by the node based on time information included in the communication that is associated with the primary node. The node may be configured to transmit a multicast communication that includes a request to join the load sharing network and an indication that the node has synchronized the time to the time information. The node may be configured to receive an indication that the node has successfully joined the load sharing network. The node may be configured to receive, from the primary node, a periodic data transfer communication that includes an indication of a reference time. The node may be configured to update the time stored by the node to the reference time if a difference between the time and the reference time satisfies a threshold.

BRIEF DESCRIPTION OF THE DRAWINGS

FIG. 7 is a flowchart of an example process associated with node-to-node network time synchronization.

DETAILED DESCRIPTION

This disclosure relates to a distributed network, which is applicable to any machine that system that utilizes the distributed network. For example, the system may operate using a load sharing network, a peer-to-peer network, a node-to-node network, a cloud computing network, a multicast network, and/or a cluster network, among other examples.

Figure 1:
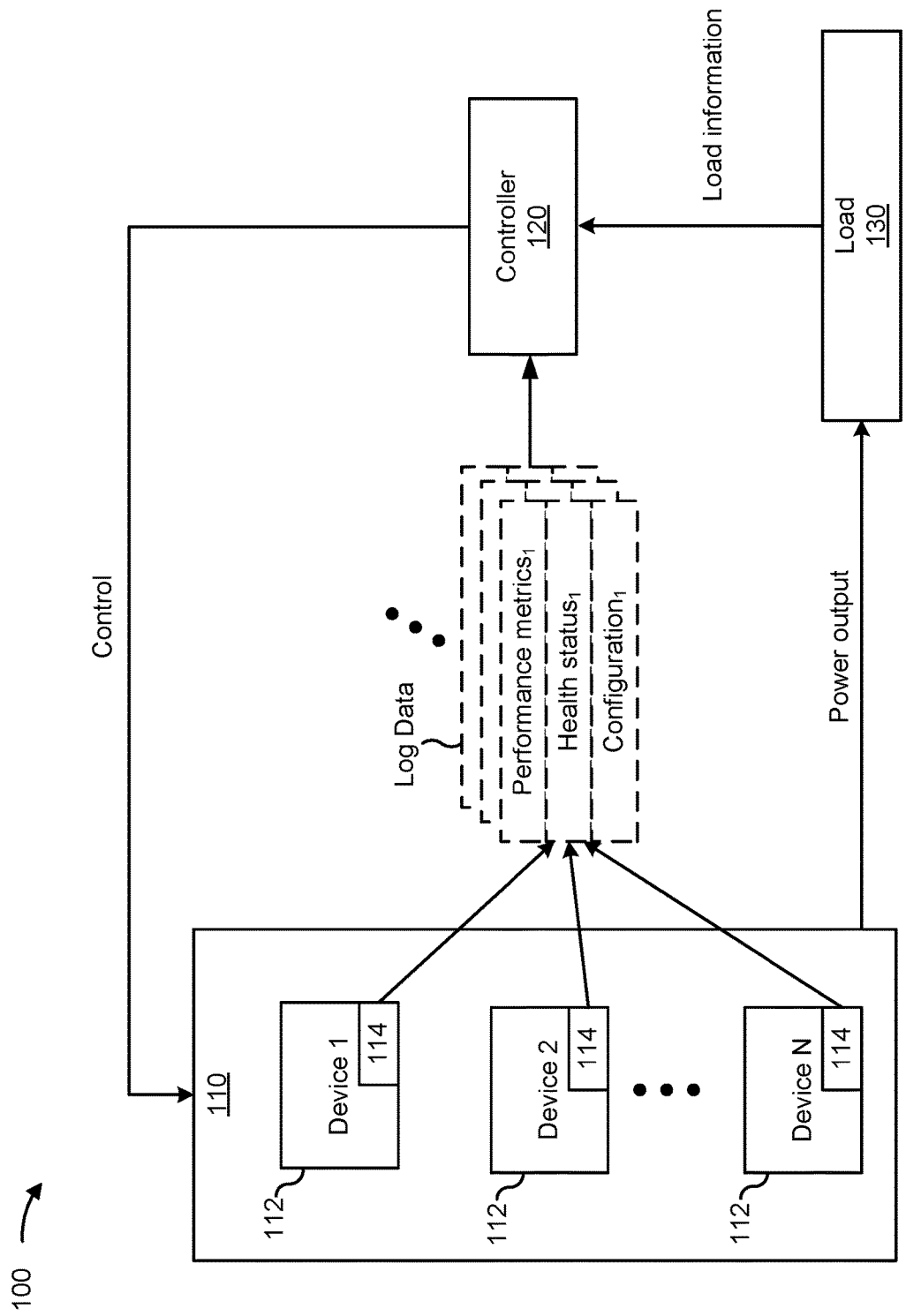
FIG. 1 is a diagram of an example system described herein.

FIG. 1 is a diagram of an example system 100 described herein. The system 100 of FIG. 1 includes device system 110 with a plurality of devices 112 (shown as device 1 to device N, where N is an integer and N>1) and corresponding control modules (CMs) 114, a controller 120, and a load 130. The plurality of devices 112 may be referred to herein collectively as "devices 112" or individually as "device 112." As shown and described herein, the controller 120 may control devices 112 of device system 110 to provide mechanical and/or electrical power to load 130. The devices 112 may be referred to herein as "nodes" in a distrusted network (e.g., a peer-to-peer network or a node-to-node network).

In some implementations, the plurality of devices 112 may be a plurality or set of generators (e.g., which may be referred to as a "generator set" or "genset") configured to provide electrical power to a load. For example, the system 100 may be a genset system. As described herein, one or more of devices 112 may include a compression ignition, internal combustion engine. In some implementations, each of the devices 112 may be a same type of device. For example, all devices 112 may be made by a same manufacturer, be a same model, be configured to output a same amount of maximum power and/or torque, be configured to operate in a same manner, and/or the like. In some implementations, one or more of the devices 112 may be a different type relative to another device 112. Furthermore, the devices 112 may be made by a different manufacturer and/or be a different model of device.

CMs 114 include one or more devices that provide corresponding control of devices 112 based on power control information from the controller 120. In some implementations, the CM 114 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), and/or another type of processing component. The processor is implemented in hardware, firmware, or a combination of hardware and software. The CM 114 may include one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by the CM 114. The CM 114 may include a memory (e.g., a non-transitory computer-readable medium) capable of storing instructions, that when executed, cause the processor to perform one or more processes and/or methods described herein.

The controller 120 includes one or more devices that provide control information to control an output (e.g., a power output or another output) from device system 110. The controller 120 may use the control information to cause the CMs 114 to control respective amounts of power that are provided from devices 112 to load 130. The controller 120 may be implemented as a processor, such as a programmable logic controller (PLC), CPU, an APU, a microprocessor, a microcontroller, a DSP, a FPGA, an ASIC, or another type of processing component. The processor may be implemented in hardware, firmware, or a combination of hardware and software. The controller 120 may include one or more processors capable of being programmed to perform a function. One or more memories, including a RAM, a ROM, and/or another type of dynamic or static storage device (e.g., a flash memory, a magnetic memory, and/or an optical memory), may store information and/or instructions for use by the controller 120. The controller 120 may include a memory (e.g., a non-transitory computer-readable medium) capable of storing instructions, that when executed, cause the processor to perform one or more processes and/or methods described herein. In some implementations, the system 100 may not include a controller 120. Rather, the devices 112 may communicate in a peer-to-peer network without any central control entity.

The controller 120 may execute the instructions to perform various control functions and processes to cause CMs 114 to control devices 112 based on load information and/or one or more parameters or one or more metrics of the device system 110. The controller 120 may include any appropriate type of control system configured to perform optimization functions, prioritization functions, and/or power control functions. In operation, the controller 120 may execute computer software instructions to perform various control functions and processes to control the device system 110, to monitor events associated with the devices 112, to communicate event indicator annunciation information, and/or to perform other operations as described herein. For example, the controller 120 may monitor and/or receive information associated with one or more metrics associated with the devices 112. As shown in FIG. 1, the one or more metrics may include performance metrics (e.g., fuel consumption rate, emission maps, engine speed, efficiency, power output, and/or the like), a real time on-board health status (e.g., a total usage, a life expectancy, component failure monitor, and/or next required or scheduled maintenance), and/or a device configuration (e.g., whether two or more of devices 112 are mechanically coupled to one another to operate together) of devices 112, among other examples.

In some implementations, each device 112 (e.g., each CM 114) may generate and/or store log data. The log data may include information associated with one or more metrics. In some implementations, the device system 110 may be associated with a shared or compiled log that includes log data generated by each device 112 in the device system 110. In some implementations, log data may be stored with a time stamp indicating a time at which the log data is generated and/or an event indicated by the log data occurred. The time stamp may be based on a clock and/or a time maintained by a device 112 (e.g., node) that generates the log data.

The controller 120 may communicate with the CMs 114 and/or other controllers via a data link. For example, the data link may be a peer-to-peer communication link, Controller Area Network (CAN) communication link, a transmission control protocol (TCP)/ Internet Protocol (IP) (TCP/IP) communication link, an internet protocol suite communication link, a MODBUS communication link, an Ethernet data link, an Ethernet user data protocol (Ethernet UDP) communication link, or another suitable data link that enables peer-to-peer communications between controllers (e.g., without a host computer or host device).

As indicated above, FIG. 1 is provided as an example. Other examples may differ from what is described with regard to FIG. 1.

Figure 2:
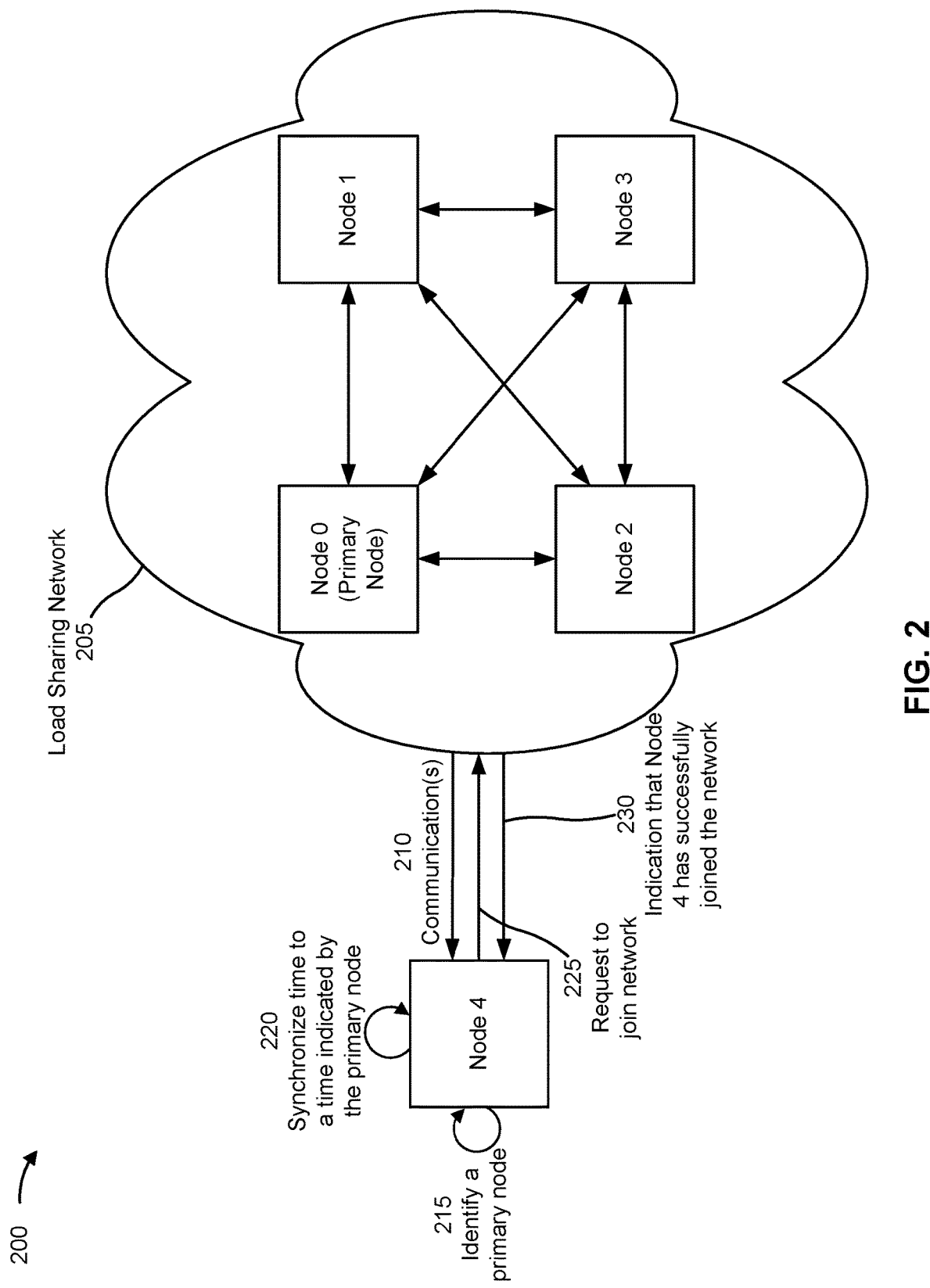
FIG. 2 is a diagram of an example associated with a node joining a load sharing network described herein.

FIG. 2 is a diagram of an example 200 associated with a node joining a load sharing network 205 described herein. The load sharing network 205 may be a distributed network, such as a peer-to-peer network, a node-to-node network, a cloud computing network, a multicast network, and/or a cluster network, among other examples. For example, in the load sharing network 205, a set of nodes (e.g., node 0, node 1, node 2, and node 3 as shown in FIG. 2) may communicate to perform load sharing operations associated with a network. In some examples, the set of nodes may be devices 112 and/or CMs 114 in a similar manner as described in connection with FIG. 1. In other examples, the nodes may be different types of devices, such as computing devices, server devices, and/or virtual computing devices, among other examples. Although examples are described herein in connection with a load sharing network, the time synchronization techniques described herein (e.g., in connection with FIGS. 2-7) may be similarly applied to distributed networks (e.g., peer-to-peer networks) that are not associated with load sharing.

The nodes of the load sharing network 205 may communicate via multicast communications. In some cases, a multicast communication may be a communication of information to a plurality (e.g., a set) of nodes. In some cases, each of the nodes may need to join a multicast session prior to receiving information using the multicast communication. In some cases, the nodes may need to be authorized, or authenticated, prior to joining the multicast session. For example, a node that has already joined the load sharing network 205 may indicate to a node whether the node is authorized or authenticated prior to the node joining the multicast session and receiving information via a multicast communication. In some cases, a node in a multicast service area that has not been authorized or authenticated may not receive the information via the multicast communication. In some cases, the multicast communication may referred to as a "one-to-many" communication. In contrast, a broadcast communication may be a communication of information to all nodes within an area (e.g., a broadcast service area). The nodes may not need to join a session prior to receiving the information using the broadcast communication. In some cases, the nodes may not need to be authorized, or authenticated, prior to receiving information via a broadcast communication. In some cases, a broadcast communication may referred to as a "one-to-all" communication.

For example, as shown in FIG. 2, a node 4 may not have joined a multicast session associated with the load sharing network 205. In other words, the node 4 may not be authorized or authenticated to join the multicast session. The node 0, the node 1, the node 2, and the node 3 may have joined the multicast session (e.g., may have been authorized and/or authenticated to join the multicast session and/or the load sharing network 205).

As shown in FIG. 2, a node, from the set of nodes associated with the load sharing network 205, may be designated as a primary node. The primary node may be a node, from the set of nodes, that is currently performing control and/or configuration operations associated with the load sharing operation(s) of the load sharing network 205. In some examples, the primary node may dynamically change over time among nodes included in the load sharing network 205 based on identifiers of respective active nodes in the load sharing network 205. An active node may be a node that has joined the multicast session (e.g., that is authorized and/or authenticated to join the multicast session and/or the load sharing network 205). For example, the load sharing network 205 may be a "moving-master" system in which the primary node is not designated as a single node, but rather can be any active node in the load sharing network 205 (e.g., depending on identifiers of respective active nodes in the load sharing network 205).

In some examples, the primary node may be identified based on an identifier associated with the primary node. For example, the primary node may be a node, from the set of nodes (active nodes) included in the load sharing network 205, that is associated with a lowest (or highest) identifier. In some examples, the identifier may be a link layer address or a multicast address (e.g., a medium access control (MAC) address). In other examples, the identifier may be another type of identifier, such as a device identifier or a unit identifier (e.g., identifying a device 112 associated with a given node). For example, the set of nodes (active nodes) included in the load sharing network 205 may exchange multicast communications that include an identifier of the transmitting node (e.g., the node that transmits a given multicast communication). The set of nodes (active nodes) included in the load sharing network 205 may identify the primary node (e.g., a master node) based on the shared identifiers of the set of nodes (active nodes) included in the load sharing network 205.

In some examples, the primary node may be identified based on an accuracy of a clock (e.g., a time) maintained by the node as compared to a real-world clock (e.g., a real world time and/or one or more clock stratum). For example, the nodes included in the load sharing network 205 may include telemetry units (or other components) that enable the nodes to obtain an indication of a real-world time or clock. For example, the real-world time or clock may be a coordinated universal time, an atomic clock, a global navigation satellite system (GNSS) clock, a radio clock, and/or an internet time protocol clock, among other examples. For example, the primary node may be selected based on having a stored time that is closest to a time, indicated by a real-world clock and/or an internet time protocol, among stored times associated with active nodes in the load sharing network. For example, each node may obtain an indication of the time indicated by the real-world clock. The nodes may compare a stored time to the time indicated by the real-world clock (e.g., to determine a difference between the stored time and the real-world time). The set of nodes included in the load sharing network 205 may share (e.g., via multicast communications) an indication of the differences between stored times of each node and the real-world time. The primary node may be selected or designated (e.g., by the nodes of the load sharing network 205) for the load sharing network 205 based on the node having the smallest difference between a stored time (e.g., of a clock maintained by the node) and the real-world time. This may enable a reference time for time synchronization procedures for the load sharing network 205 (e.g., as explained in more detail elsewhere herein) to be closer to the real-world time, such that all nodes in the load sharing network 205 are synchronized to a time that is close to the real-world time.

As shown in FIG. 2, the primary node may be the node 0. The primary node may perform one or more operations associated with controlling and/or configuring load sharing operations for the load sharing network 205. For example, the primary node may perform operations similar to the operations performed by the controller 120 as described above in connection with FIG. 1. Additionally, a time (e.g., a clock) maintained by the primary node may serve as a reference time (e.g., a reference clock) for time synchronization for the load sharing network 205. This may improve operations for the load sharing network because the node that is performing the control and/or configuration operations for the load sharing operations for the load sharing network 205 also provides the reference time to which other nodes in the load sharing network 205 are synchronized. This may ensure that a time and/or clock that is maintained by other nodes in the network is synchronized to a time and/or a clock that is associated with performing the control and/or configuration operations for the load sharing operations for the load sharing network 205. For example, this may ensure that, if a time is associated with a control and/or configuration operation at the primary node, that other nodes included in the load sharing network are synchronized to the time associated with the control and/or configuration operation.

As shown in FIG. 2, access to the load sharing network 205 and/or a multicast session associated with the load sharing network 205 may be barred and/or restricted until a node that is attempting to join the load sharing network 205 and/or the multicast session has synchronized a time (and/or clock) maintained by the node to a time (and/or clock) maintained by the current primary node of the load sharing network (e.g., node 0 as shown in FIG. 2). In other words, access for the node 4 to the load sharing network 205 may be barred until the node 4 synchronizes a time stored by the node 4 based on time information included in a communication that is associated with the primary node (e.g., the node 0). For example, in order for the node 4 to be authorized to join the load sharing network 205 and/or the multicast session, a node in the load sharing network 205 (e.g., the primary node or another node) may verify that the node 4 has synchronized the time maintained by the node 4 to the time maintained by the primary node.

As shown by reference number 210, the node 4 may receive one or more communications associated with one or more nodes (e.g., active nodes) included in the load sharing network 205. In some implementations, the one or more communications may be data transfer communications associated with the load sharing network 205. For example, the node 4 may be permitted to receive multicast communications associated with the load sharing network 205, but may not be permitted to join the load sharing network 205 (e.g., to participate in load sharing operations) until the node 4 has synchronized a time stored by the node 4 to the time indicated by the primary node (e.g., the node 0). In other examples, the one or more communications may be broadcast communications associated with the load sharing network 205.

The one or more communications may include time information (e.g., a time stamp and/or a time maintained by the node that transmitted a given communication). For example, a transmitting node may transmit a communication (e.g., a data transfer communication, a load sharing communication, a multicast communication, or a broadcast communication) that includes an indication of a time and/or a clock maintained by the transmitting node. The primary node (e.g., the node 0) may transmit a communication that includes time information (e.g., a time stamp) and an indication that the communication is associated with the current primary node for the load sharing network 205. For example, the communication may include a flag or other indicator (e.g., one or more bits) to indicate that the communication is associated with the current primary node for the load sharing network 205. Additionally, or alternatively, a transmitting node may transmit a communication (e.g., a data transfer communication, a load sharing communication, a multicast communication, or a broadcast communication) that includes an indication of an identifier associated with the transmitting node.

As shown by reference number 215, the node 4 may identify the primary node associated with the load sharing network 205 based on an indicator included in a communication received by the node 4 (e.g., as described above in connection with reference number 210). For example, indicator may be a flag or other indicator (e.g., one or more bits) that indicate that the communication is associated with the current primary node for the load sharing network 205. Additionally, or alternatively, the indicator may be an identifier associated with the primary node (e.g., the node 0). For example, the node 4 may identify a communication that is associated with a lowest (or highest) identifier of nodes associated with the load sharing network 205 (e.g., of received communications from the load sharing network 205). In some examples, only the primary node (e.g., and no other active nodes in the load sharing network 205) may transmit a communication to the node 4 (e.g., that is not an active node in the load sharing network 205). Therefore, the node 4 may identify that the communication is received from the primary node because only the primary node transmits (e.g., broadcasts) communications to the node 4 before the node 4 has joined the load sharing network 205 and/or the multicast session.

As shown by reference number 220, the node 4 may synchronize a time stored by the node 4 based on time information included in the communication that is associated with the primary node (e.g., the node 0). For example, the node 4 may set the time stored by the node 4 and/or a clock maintained by the node 4 to the time indicated in the communication that is transmitted by the current primary node of the load sharing network 205 (e.g., the node 0). In other words, the time indicated in the communication that is transmitted by the current primary node of the load sharing network 205 (e.g., the node 0) may be a reference time for time synchronization performed by the node 4 prior to joining the load sharing network 205 and/or the multicast session.

As shown by reference number 225, the node 4 may transmit a request to join the load sharing network 205 and/or the multicast session. For example, the node 4 may transmit a multicast communication that includes a request to join the load sharing network 205 and an indication that the node 4 has synchronized the time stored by the node 4 to the time information indicated by the primary node. In some implementations, the node 4 may transmit the request to join the load sharing network 205 directly to the primary node (e.g., in a "one-to-one" communication). In other examples, the node 4 may transmit the request to join the load sharing network 205 in a multicast communication (e.g., to multicast address(es) associated with the multicast session for the load sharing network 205). In other examples, the node 4 may transmit the request to join the load sharing network 205 in a broadcast communication.

A node (e.g., an active node) in the load sharing network 205 may receive the request from the node 4 to join the load sharing network 205 and/or the multicast session. For example, the primary node (e.g., the node 0) may receive the request from the node 4 to join the load sharing network 205 and/or the multicast session. The node may determine whether the node 4 is authorized to join the load sharing network 205 and/or is authenticated prior to enabling the node 4 to join the load sharing network 205. For example, the node (e.g., the primary node or another node) may determine whether the node 4 has synchronized the time stored by the node 4 to the time stored by the primary node. If the node 4 has not synchronized the time stored by the node 4 to the time stored by the primary node, then the node (e.g., the primary node or another node) may determine that the node 4 is not permitted to join the load sharing network 205 and/or the multicast session. If the node 4 has synchronized the time stored by the node 4 to the time stored by the primary node, then the node (e.g., the primary node or another node) may determine that the node 4 is permitted to join the load sharing network 205 and/or the multicast session (e.g., so long as other authentication and/or authorization procedures for the node 4 are performed successfully).

As shown by reference number 230, the node 4 may receive (e.g., from the primary node or another node in the load sharing network 205) an indication that the node 4 has successfully joined the load sharing network 205 (e.g., that the node 4 has been added to the multicast session associated with the load sharing network 205). For example, the node 4 may be added to the multicast session associated with the load sharing network 205 based on the node 4 synchronizing time to the time stored by the current primary node of the load sharing network 205 (e.g., the node 0). For example, the node 4 may receive load sharing configuration information, multicast session configuration information, and/or other information that enables the node 4 to join the load sharing network 205 and/or to participate in load sharing operations. As a result, the node(s) of the load sharing network 205 (e.g., the primary node or another node) may ensure that nodes are not added to the load sharing network 205 until the nodes have synchronized time to the current primary node of the load sharing network 205.

As indicated above, FIG. 2 is provided as an example. Other examples may differ from what is described with regard to FIG. 2.

Figure 3:
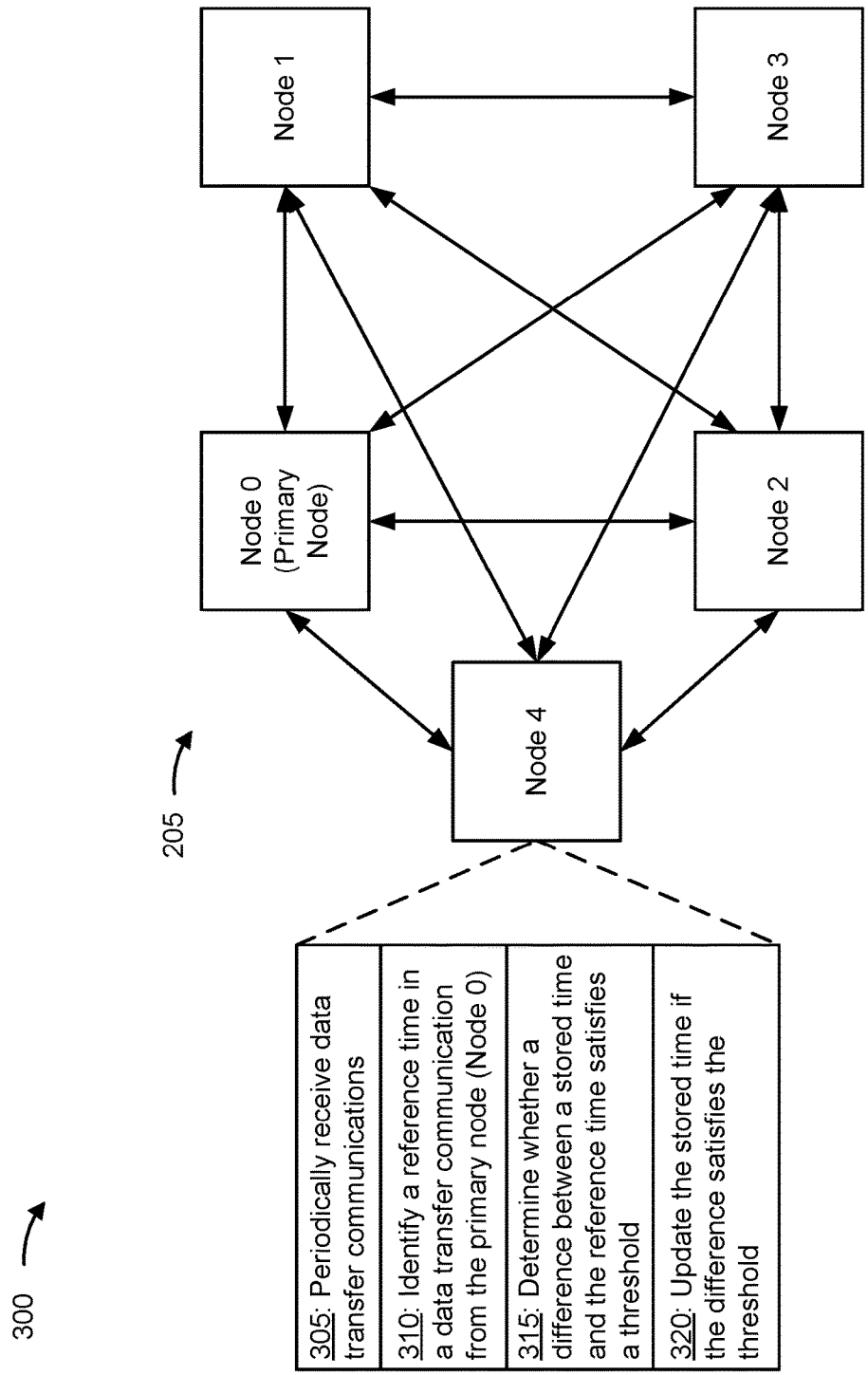
FIG. 3 is a diagram of an example associated with a node maintaining time synchronization in the load sharing network described herein.

FIG. 3 is a diagram of an example 300 associated with a node maintaining time synchronization in the load sharing network 205 described herein. The operations described in connection with FIG. 3 and example 300 may be performed in addition to the operations described in connection with FIG. 2 and example 200. For example, the operations described in connection with FIG. 3 and example 300 may be performed after the operations described in connection with FIG. 2 and example 200. In some examples, the operations described in connection with FIG. 3 and example 300 may be performed independent of the operations described in connection with FIG. 2 and example 200 and/or without the operations described in connection with FIG. 2 and example 200 being performed.

As shown by reference number 305, the nodes (e.g., the active nodes) of the load sharing network 205 may periodically exchange data transfer communications. A data transfer communication may be a communication (e.g., a multicast communication) that includes data stored by and/or generated by a node that is transmitting the communication. For example, as part of a load sharing operation, the nodes of the load sharing network 205 may periodically exchange data sets stored by and/or generated by the nodes. For example, a data transfer communication may be a critical communication that is used for load sharing operations. In some examples, the nodes of the load sharing network 205 may periodically or cyclically transmit data transfer communications. For example, a node may transmit a data transfer communication (e.g., a multicast data transfer communication) every X milliseconds (e.g., every 30 milliseconds, every 100 milliseconds, or another amount of time).

A data transfer communication may be associated with a format that is designed for, or configured for, exchanging data associated with the load sharing network 205 and/or the load sharing operation(s) of the load sharing network 205. For example, the nodes of the load sharing network 205 may be configured with the format (e.g., to enable the nodes to receive, decode, and/or otherwise obtain information from the data transfer communications). In some examples, a data transfer communication may indicate data obtained from a system, such as the system 100, and/or a device, such as a device 112. In some examples, a data transfer communication may indicate data such as performance data (e.g., fuel consumption rate, emission maps, engine speed, efficiency, power output, and/or the like), a real time on-board health status data (e.g., a total usage, a life expectancy, component failure monitor, and/or next required or scheduled maintenance), and/or a device or node configuration, among other examples.

In some implementations, a data transfer communication may include an indication of a time stored by a node that transmits the data transfer communication. For example, a data transfer communication may include a time stamp indicating a time at which the data transfer communication is transmitted. The time stamp may be based on a current time as stored by the node that is transmitting the data transfer communication. For example, the node 4 (e.g., after joining the load sharing network 205 and/or the multicast session) may periodically receive data transfer communications from other nodes in the load sharing network 205. Additionally, the node 4 may periodically transmit data transfer communications (e.g., in multicast communications associated with the multicast session).

As shown by reference number 310, the node 4 may identify a reference time for time synchronization in a data transfer communication from the primary node (e.g., the node 0). For example, the node 0 (e.g., the current primary node for the load sharing network 205) may transmit a data transfer communication. The data transfer communication may include a time stamp (e.g., indicating a time at which the data transfer communication is transmitted by the node 0). In some implementations, the data transfer communication may include an indication that the data transfer communication is transmitted by the current primary node for the load sharing network 205. For example, the data transfer communication may include a flag or other indicator indicating that the data transfer communication has been transmitted by the primary node. As another example, the data transfer communication may include an indication of an identifier associated with the node 0 (e.g., enabling the node 4 to identify that the data transfer communication is associated with the current primary node).

The node 4 may selectively update the time stored by the node 4 based on the reference time included in periodic data transfer communications that are associated with the primary node (e.g., the node 0). For example, the node 4 may update the time stored by the node 4 if the stored time has drifted from the reference time stored by the primary node. For example, the node 4 may receive, from the primary node, a data transfer communication from the periodic data transfer communications transmitted by the primary node. The node 4 may identify that a data transfer communication has been received from the primary node (e.g., based on an indicator or identifier included in the data transfer communication).

As shown by reference number 315, the node 4 may determine whether a difference between the time stored by the node 4 and the reference time satisfies a threshold. The reference time may be indicated in the data transfer communication, as described above. The node 4 may compare the reference time to a time (e.g., indicated by a clock maintained by the node 4) when the data transfer communication is received by the node 4. In some implementations, a value of the threshold a function of a period (e.g., X) associated with the periodic data transfer communications. For example, the value of the threshold may be M·X, where M is a value greater than zero. This may ensure that a clock and/or time maintained by the node 4 does not drift from the reference time by an amount greater than the period at which the data transfer communications are transmitted. In other examples, the value of the threshold may be independent from the period associated with the periodic data transfer communications.

As shown by reference number 320, the node 4 may update the time stored by the node 4 if the difference satisfies the threshold. For example, if the time and/or clock stored by the node 4 has deviated by a given amount (e.g., indicated by the threshold) from the time and/or clock stored by the current primary node of the load sharing network 205, then the node 4 may update the time and/or clock stored by the node 4 to the reference time indicated in the data transfer communication received by the node 4 from the primary node. If the difference does not satisfy the threshold, then the node may not (e.g., may refrain from) updating the current time and/or the clock maintained by the node 4.

Other nodes in the load sharing network 205 may selectively update stored times and/or clocks based on a reference time indicated by the primary node in a data transfer communication in a similar manner as described above. By utilizing the data transfer communications for time synchronization in the load sharing network 205, a complexity associated with the time synchronization may be reduced. For example, nodes in the load sharing network 205 may already be configured to exchange the data transfer communications. Therefore, additional time synchronization procedures and/or signaling may not need to be configured for the nodes. Rather, only a few (e.g., one or more) fields and/or bits may be added to an existing data transfer communication format to enable the time synchronization procedures. Additionally, the nodes may not be required to transmit additional time synchronization signals and instead may use the data transfer communications (e.g., which are already transmitted by the nodes for the load sharing operations) to indicate time information to enable the time synchronization for the load sharing network 205. This may reduce signaling overhead associated with performing the time synchronization, thereby conserving network resources, processing resources, and/or computing resources, among other examples.

In some implementations, the node 4 may generate log data associated with the load sharing network 205. The log data may indicate an event detected by the node 4, an error detected by the node 4, and/or other information associated with operations of the load sharing network 205. The node 4 may include a time stamp (e.g., an indication of a current time) indicating a time at which the log data is generated in the log data. The time stamp may be based on the time and/or clock maintained by the node 4 (e.g., that is synchronized to the reference time provided by the primary node, as described above). The node 4 may store the log data (e.g., in a centralized database associated with the load sharing network 205 or in another storage location). Therefore, log data generated by the nodes of the load sharing network 205 may be time synchronized. This may enable an operator to accurately and/or efficiently compare log data generated by a first node (e.g., node 1) to log data generated by another node (e.g., node 4) because the time maintained by the different nodes are synchronized, as described above. This may improve debugging, development, and/or testing performed by the operator.

As indicated above, FIG. 3 is provided as an example. Other examples may differ from what is described with regard to FIG. 3.

Figure 4:
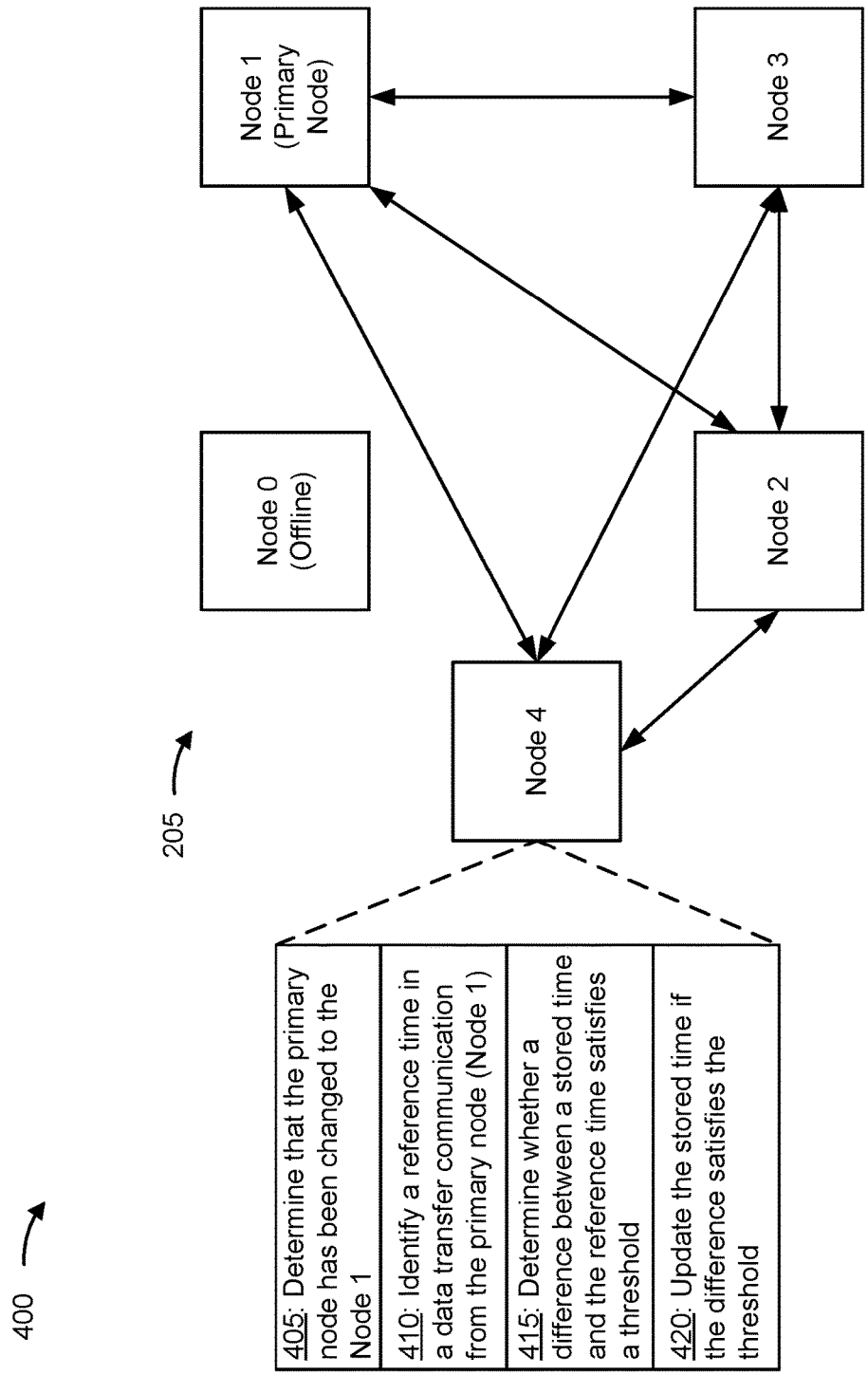
FIG. 4 is a diagram of an example associated with a updating a primary node for time synchronization in the load sharing network described herein.

FIG. 4 is a diagram of an example 400 associated with a updating a primary node for time synchronization in the load sharing network 205 described herein. The operations described in connection with FIG. 4 and example 400 may be performed in addition to the operations described in connection with FIG. 2 and example 200 and/or with FIG. 3 and example 300. For example, the operations described in connection with FIG. 4 and example 400 may be performed after the operations described in connection with FIG. 2 and example 200 and/or with FIG. 3 and example 300. In some examples, the operations described in connection with FIG. 4 and example 400 may be performed independent of the operations described in connection with FIG. 2 and example 200 and/or with FIG. 3 and example 300 (e.g., without the operations described in connection with FIG. 2 and example 200 and/or with FIG. 3 and example 300 being performed).

As shown in FIG. 4, a node that was serving as the primary node for the load sharing network 205 may leave the load sharing network 205 and/or the multicast session. For example, as shown in FIG. 4, the node 0 may go offline. In some implementations, prior to going offline, the node 0 may transmit a communication (e.g., a multicast communication) indicating that the node 0 is going to go offline and/or leave the load sharing network 205. Other nodes in the load sharing network node may receive the communication and identify a new primary node for the load sharing network 205 among the active nodes in the load sharing network 205.

For example, as shown by reference number 405, the node 4 may determine that the primary node has been changed to the node 1 (e.g., from the node 0). For example, the primary node may be identified among the active nodes of the load sharing network 205 (e.g., after the node 0 goes offline) in a similar manner as described above. In some examples, the new primary node may be identified based on an identifier associated with the new primary node. For example, the new primary node may be a node, from the set of nodes (active nodes) included in the load sharing network 205, that is associated with a lowest (or highest) identifier. In some examples, the new primary node may be identified based on an accuracy of a clock (e.g., a time) maintained by the node as compared to a real-world clock (e.g., a real world time and/or one or more clock stratum).

In some implementations, the node 4 may receive a data transfer communication indicating that the primary node has been switched to the node 1 (e.g., from the node 0). For example, after determining that the node 1 is to serve as the primary node for the load sharing network, the node 1 may begin to include an indicator in periodic data transfer communications indicating that the node 1 is serving as the primary node.

As shown by reference number 410, the node 4 may identify a reference time for time synchronization in a data transfer communication from the primary node (e.g., the node 1). For example, the node 1 (e.g., the current primary node for the load sharing network 205) may transmit a data transfer communication. The data transfer communication may include a time stamp (e.g., indicating a time at which the data transfer communication is transmitted by the node 1). In some implementations, the data transfer communication may include an indication that the data transfer communication is transmitted by the current primary node for the load sharing network 205.

The node 4 may selectively update the time stored by the node 4 based on the reference time included in periodic data transfer communications that are associated with the primary node (e.g., the node 1) in a similar manner as described above. For example, as shown by reference number 415, the node 4 may determine whether a difference between the time stored by the node 4 and the reference time satisfies the threshold. As shown by reference number 420, the node 4 may update the time stored by the node 4 (e.g., to the reference time provided by the node 1) if the difference satisfies the threshold. In other words, the node 4 may receive an indication that the primary node has been updated to a different node (e.g., the node 1) in the load sharing network 205. The node 4 may selectively update the time stored by the node 4 based on another reference time included in periodic data transfer communications that are associated with the different node (e.g., the node 1) based on receiving the indication that the primary node has been updated to the different node.

In this way, when a current primary node leaves the load sharing network 205, the operations and/or functions associated with the primary node may be quickly transitioned to another node in the load sharing network 205. The other node (e.g., the node 1) may quickly assume a function of providing a reference time (e.g., in data transfer communications) for the load sharing network 205. This may reduce a time associated with transitioning to a new primary node. Additionally, because all nodes in the load sharing network 205 were synchronized in time with the reference time of the previous primary node, this may reduce a complexity associated with updating the node that provides the new reference time because the time and/or clock maintained by the new primary node (e.g., the node 1) may be similar to (e.g., have a difference that satisfies the threshold from) the time and/or clock maintained by the previous primary node (e.g., the node 0). Therefore, a significant update in the reference time may not occur.

As indicated above, FIG. 4 is provided as an example. Other examples may differ from what is described with regard to FIG. 4.

Figure 5:
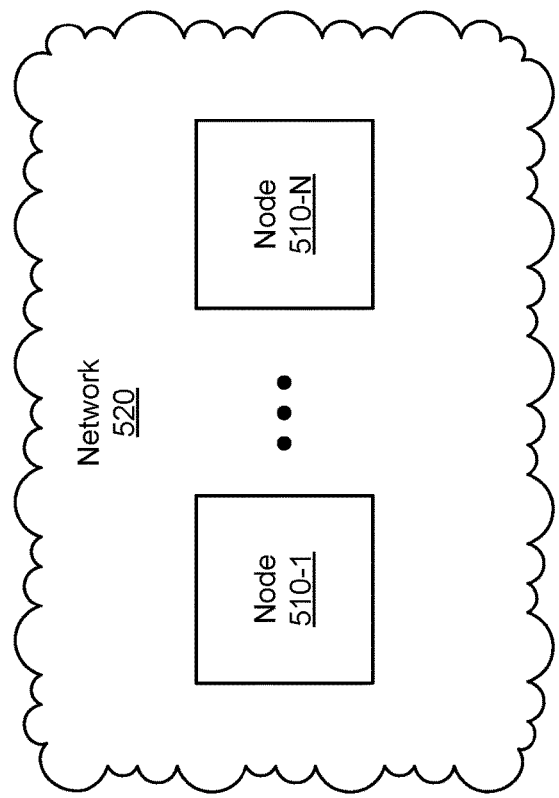
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a set of nodes 510 (shown as node 510-1 through node 510-N), and a network 520. Devices of environment 500 may interconnect via wired connections, wireless connections, or a combination of wired and wireless connections.

A node 510 may include one or more devices capable of receiving, processing, storing, routing, and/or providing traffic (e.g., a payload packet, and/or a file, among other examples) in a manner described herein. For example, a node 510 may include a router, a gateway, a switch, a firewall, a hub, a bridge, a reverse proxy, a server (e.g., a proxy server, a cloud server, and/or a data center server), a device control module, a load balancer, and/or a similar device. In some implementations, the node 510 may include a communication device and/or a computing device. For example, the node 510 may include a server, such as an application server, a client server, a web server, a database server, a host server, a proxy server, a virtual server (e.g., executing on computing hardware), or a server in a cloud computing system. In some implementations, the node 510 may include computing hardware used in a cloud computing environment. In some implementations, the node 510 may be a physical device implemented within a housing, such as a chassis. In some implementations, node 510 may be a virtual device implemented by one or more computer devices of a cloud computing environment or a data center.

The network 520 may include one or more wired and/or wireless networks. For example, the network 520 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 520 enables communication among the devices of environment 500.

The quantity and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
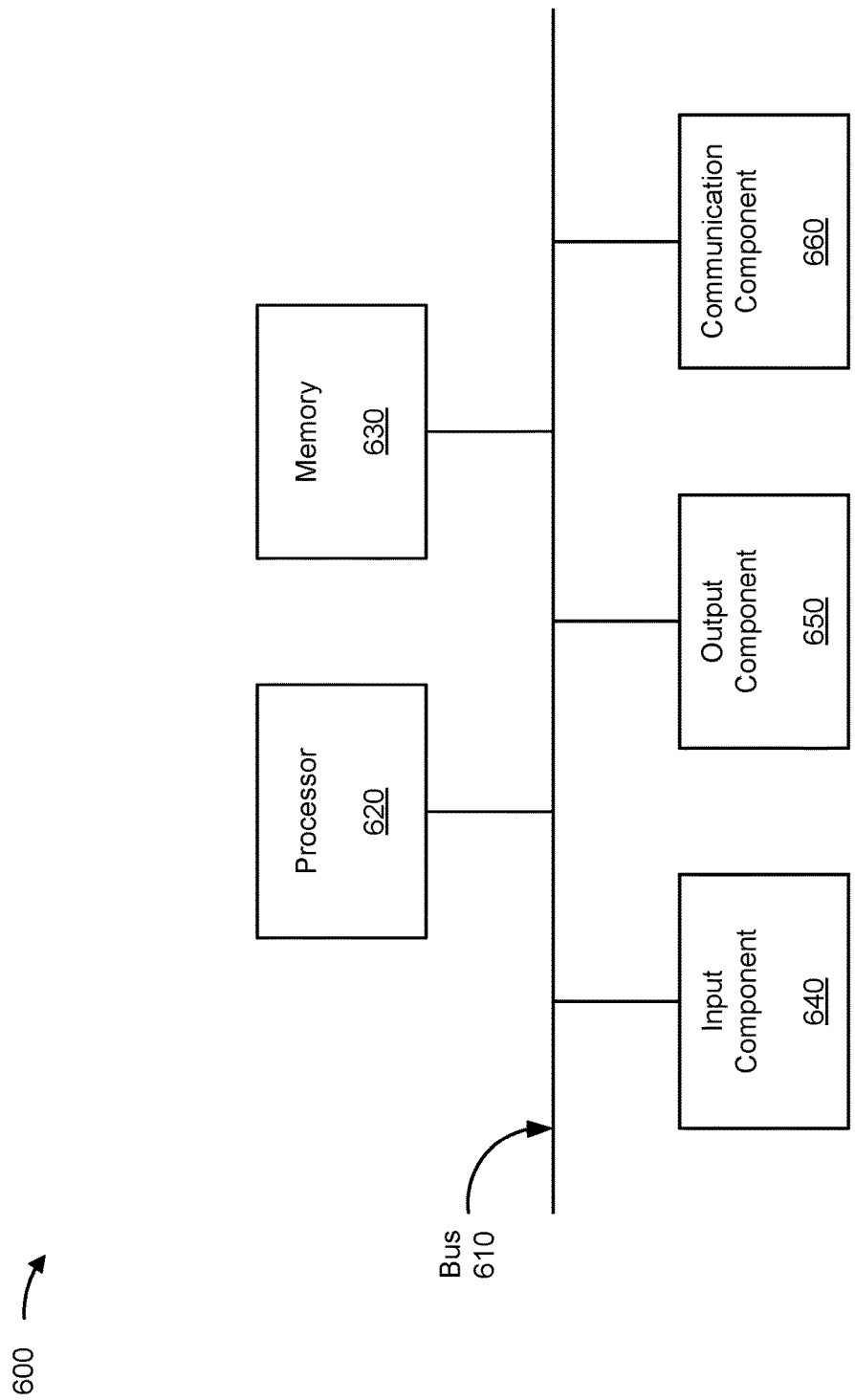
FIG. 6 is a diagram of example components of a device associated with node-to-node network time synchronization.

FIG. 6 is a diagram of example components of a device 600 associated with node-to-node network time synchronization. The device 600 may correspond to the node 510, the device 112, and/or a CM 114, among other examples. In some implementations, the node 510, the device 112, and/or a CM 114, among other examples may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hard-wired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The quantity and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

FIG. 7 is a flowchart of an example process 700 associated with node-to-node network time synchronization. In some implementations, one or more process blocks of FIG. 7 may be performed by a node (e.g., a node 510 and/or the node 4). In some implementations, one or more process blocks of FIG. 7 may be performed by another device or a group of devices separate from or including the node, such as another node in the peer-to-peer network (e.g., the load sharing network 205). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving one or more communications, wherein the one or more communications include time information, and wherein the one or more communications are associated with a peer-to-peer network (block 710). For example, the node may receive one or more communications, wherein the one or more communications include time information, and wherein the one or more communications are associated with a peer-to-peer network, as described above.

As further shown in FIG. 7, process 700 may include identifying a primary node associated with the peer-to-peer network based on an indicator included in a communication, from the one or more communications, that is associated with the primary node (block 720). For example, the node may identify a primary node associated with the peer-to-peer network based on an indicator included in a communication, from the one or more communications, that is associated with the primary node, as described above. In some implementations, identifying the primary node is based on an identifier associated with the primary node. In some implementations, the identifier is a link layer address or a multicast address. In some implementations, the primary node dynamically changes over time among nodes included in the peer-to-peer network based on identifiers of respective active nodes in the peer-to-peer network.

As further shown in FIG. 7, process 700 may include synchronizing a time stored by the node based on time information included in the communication that is associated with the primary node (block 730). For example, the node may synchronize a time stored by the node based on time information included in the communication that is associated with the primary node, as described above.

As further shown in FIG. 7, process 700 may include transmitting a communication that includes a request to join the peer-to-peer network and an indication that the node has synchronized the time to the time information (block 740).

For example, the node may transmit a communication that includes a request to join the peer-to-peer network and an indication that the node has synchronized the time to the time information, as described above.

As further shown in FIG. 7, process 700 may include receiving an indication that the node has successfully joined the peer-to-peer network (block 750). For example, the node may receive an indication that the node has successfully joined the peer-to-peer network, as described above.

As further shown in FIG. 7, process 700 may include selectively updating the time stored by the node based on a reference time included in periodic data transfer communications that are associated with the primary node (block 760). For example, the node may selectively update the time stored by the node based on a reference time included in periodic data transfer communications that are associated with the primary node, as described above.

In some implementations, alone or in combination with one or more of the first through third implementations, selectively updating the time comprises receiving, from the primary node, a data transfer communication from the periodic data transfer communications, wherein the data transfer communication includes an indication of the reference time, determining whether a difference between the time stored by the node and the reference time satisfies a threshold, and updating the time stored by the node to the reference time based on the difference satisfying the threshold. In some implementations, alone or in combination with one or more of the first through fourth implementations, a value of the threshold is a function of a period associated with the periodic data transfer communications.

In some implementations, alone or in combination with one or more of the first through fifth implementations, process 700 includes receiving an indication that the primary node has been updated to a different node in the peer-to-peer network, and selectively updating the time stored by the node based on another reference time included in periodic data transfer communications that are associated with the different node based on receiving the indication that the primary node has been updated to the different node.

In some implementations, alone or in combination with one or more of the first through sixth implementations, process 700 includes generating log data associated with the peer-to-peer network, wherein the log data includes a time stamp that is based on the time stored by the node.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

INDUSTRIAL APPLICABILITY

Time synchronization may aim to coordinate otherwise independent clocks. Even when initially set accurately, clocks will differ after some amount of time due to clock drift. Clock drift may be caused by clocks counting time at different rates. In a distributed network, such as the load sharing network 205, each node may independently maintain time (e.g., a clock). However, because there may not any central coordination, time synchronization between nodes of the load sharing network 205 may be difficult. In some cases, time synchronization protocols may be used to synchronize time and/or clocks among distributed nodes. However, such time synchronization protocols require additional time synchronization signaling between nodes and/or access to a central server that serves as a reference clock. The additional time synchronization signaling may consume network resources, processing resources, and/or computing resources, among other examples. Additionally, in some cases, nodes of the load sharing network 205 may not have access to a centralized reference clock (e.g., may not have internet access). Further, a failure of a centralized or primary node (e.g., that maintains a reference clock) may result in a failure for time synchronization for the entire load sharing network 205.

Some implementations described herein enable time synchronization in a peer-to-peer or node-to-node network (e.g., the load sharing network 205) using data transfer communications. For example, a node may identify a current primary node among active nodes of the load sharing network 205. The node may synchronize a time stored by and/or a clock maintained by the node to a reference time provided by the primary node. The node may selectively update the time stored by the node based on a reference time included in periodic data transfer communications that are associated with the primary node.

By utilizing the data transfer communications for time synchronization in the load sharing network 205, a complexity associated with the time synchronization may be reduced. For example, nodes in the load sharing network 205 may already be configured to exchange the data transfer communications. Therefore, additional time synchronization procedures and/or signaling may not need to be configured for the nodes. Rather, only a few (e.g., one or more) fields and/or bits may be added to an existing data transfer communication format to enable the time synchronization procedures. Additionally, the nodes may not be required to transmit additional time synchronization signals and instead may use the data transfer communications (e.g., which are already transmitted by the nodes for the load sharing operations) to indicate time information to enable the time synchronization for the load sharing network 205. This may reduce signaling overhead associated with performing the time synchronization, thereby conserving network resources, processing resources, and/or computing resources, among other examples. Additionally, log data generated by the nodes of the load sharing network 205 may be time synchronized. This may enable an operator to accurately and/or efficiently compare log data generated by a first node (e.g., node 1) to log data generated by another node (e.g., node 4) because the time maintained by the different nodes are synchronized, as described above. This may improve debugging, development, and/or testing performed by the operator.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A node, comprising:
one or more memories; and
one or more processors, coupled to the one or more memories, configured to:
receive one or more communications, wherein the one or more communications include time information, and wherein the one or more communications are associated with a load sharing network;
identify a primary node associated with the load sharing network based on an indicator included in a communication, from the one or more communications, that is associated with the primary node;
synchronize a time stored by the node based on time information included in the communication that is associated with the primary node;
transmit a multicast communication that includes a request to join the load sharing network and an indication that the node has synchronized the time stored by the node to the time information;
receive an indication that the node has successfully joined the load sharing network;
receive, from the primary node, a data transfer communication from periodic data transfer communications that are associated with the primary node, wherein the data transfer communication includes an indication of a reference time;
determine whether a difference between the time stored by the node and the reference time satisfies a threshold; and
selectively update the time stored by the node to the reference time based on whether the difference satisfies the threshold.

2. The node of claim 1, wherein the one or more communications and the periodic data transfer communications are multicast communications associated with the load sharing network.

3. The node of claim 1, wherein identifying the primary node is based on an identifier associated with the primary node.

4. The node of claim 1, wherein the one or more processors are further configured to:
receive an indication that the primary node has been updated to a different node in the load sharing network; and
selectively update the time stored by the node based on another reference time included in periodic data transfer communications that are associated with the different node based on receiving the indication that the primary node has been updated to the different node.

5. The node of claim 1, wherein the one or more processors are further configured to:
store log data associated with the load sharing network, wherein the log data includes a time stamp that is based on the time stored by the node.

6. The node of claim 1, wherein the primary node is selected based on having a stored time that is closest to a time, indicated by an internet time protocol, among stored times associated with active nodes in the load sharing network.

7. The node of claim 1, wherein, to receive the one or more communications, the one or more processors are configured to:
receive the one or more communications from the load sharing network.

8. A method, comprising:
receiving, by a node, one or more communications, wherein the one or more communications include time information, and wherein the one or more communications are associated with a peer-to-peer network;
identifying, by the node, a primary node associated with the peer-to-peer network based on an indicator included in a communication, from the one or more communications, that is associated with the primary node;
synchronizing, by the node, a time stored by the node based on time information included in the communication that is associated with the primary node;
transmitting, by the node, a communication that includes a request to join the peer-to-peer network and an indication that the node has synchronized the time stored by the node to the time information;
receiving, by the node, an indication that the node has successfully joined the peer-to-peer network;
receiving, by the node and from the primary node, a data transfer communication from periodic data transfer communications that are associated with the primary node, wherein the data transfer communication includes an indication of a reference time;
determining, by the node, whether a difference between the time stored by the node and the reference time satisfies a threshold; and
selectively updating, by the node, the time stored by the node to the reference based on whether the difference satisfies the threshold.

9. The method of claim 8, wherein identifying the primary node is based on an identifier associated with the primary node.

10. The method of claim 9, wherein the identifier is a link layer address or a multicast address.

11. The method of claim 8, wherein the primary node dynamically changes over time among nodes included in the peer-to-peer network based on identifiers of respective active nodes in the peer-to-peer network.

12. The method of claim 8, wherein a value of the threshold is a function of a period associated with the periodic data transfer communications.

13. The method of claim 8, further comprising:
receiving an indication that the primary node has been updated to a different node in the peer-to-peer network; and
selectively updating the time stored by the node based on another reference time included in periodic data transfer communications that are associated with the different node based on receiving the indication that the primary node has been updated to the different node.

14. The method of claim 8, further comprising:
generating log data associated with the peer-to-peer network, wherein the log data includes a time stamp that is based on the time stored by the node.

15. The method of claim 8, wherein receiving the one or more communications comprises:
  receiving the one or more communications from the peer-to-peer network.

16. A system, comprising:
  a set of nodes configured to perform load sharing,
    the set of nodes including a node configured to:
      identify a primary node based on an indicator included in a communication that is associated with the primary node;
      synchronize a time stored by the node based on time information included in the communication that is associated with the primary node; transmit a multicast communication that includes a request to join a load sharing network and an indication that the node has synchronized the time stored by the node to the time information;
  receive an indication that the node has successfully joined the load sharing network;
  receive, from the primary node, a periodic data transfer communication that includes an indication of a reference time;
  determine that a difference between the time stored by the node and the reference time satisfies a threshold; and
  update the time stored by the node to the reference time based on the difference satisfying the threshold.

17. The system of claim 16, wherein access for the node to the load sharing network is barred until the node synchronizes the time stored by the node based on time information included in the communication that is associated with the primary node.

18. The system of claim 16, wherein the primary node dynamically changes over time among the set of nodes based on identifiers of respective active nodes.

19. The system of claim 16, wherein the periodic data transfer communication is associated with a communication format that is used for the load sharing.

20. The system of claim 16, wherein the node is further configured to:
  receive an indication that the primary node has been updated to a different node included in the set of nodes; and
  selectively update the time stored by the node based on another reference time included in periodic data transfer communications that are associated with the different node based on receiving the indication that the primary node has been updated to the different node.

* * * * *